United States Patent
Metzger

[11] Patent Number: 5,854,441
[45] Date of Patent: Dec. 29, 1998

[54] DEVICE FOR INFLATING AN AIRBAG ACCOMMODATED IN A STEERING WHEEL

[75] Inventor: Marcus Metzger, Baden-Baden, Germany

[73] Assignee: TRW Automotive Safety Systems GmbH, Aschaffenburg, Germany

[21] Appl. No.: 893,886

[22] Filed: Jul. 11, 1997

[30] Foreign Application Priority Data

Jul. 20, 1996 [DE] Germany ................. 196 29 339.1

[51] Int. Cl.$^6$ .................... B60R 21/26; C06D 5/00
[52] U.S. Cl. ................... 102/531; 222/5; 280/737; 280/741; 137/68.13
[58] Field of Search ................... 102/530, 531; 280/731, 737, 741; 222/3, 5; 137/68.13, 68.3

[56] References Cited

U.S. PATENT DOCUMENTS

| | | | |
|---|---|---|---|
| 2,947,315 | 8/1960 | Connell | 137/68.3 |
| 2,997,051 | 8/1961 | Williams | 137/68.13 |
| 3,642,304 | 2/1972 | Johnson et al. | 222/5 |
| 3,892,253 | 7/1975 | Covarrubias | 137/68.13 |
| 4,268,065 | 5/1981 | Granig | 280/737 |
| 4,288,005 | 9/1981 | Boo-Hoo | 280/737 |
| 4,600,123 | 7/1986 | Galbraith | 102/530 |
| 5,342,089 | 8/1994 | Fink et al. | 280/731 |
| 5,378,018 | 1/1995 | Ketterer et al. | 280/737 |
| 5,482,315 | 1/1996 | Chandler, Jr. et al. | |
| 5,655,789 | 8/1997 | Kreuzer | 280/731 |

FOREIGN PATENT DOCUMENTS

| | | |
|---|---|---|
| 0554919 | 1/1991 | European Pat. Off. . |
| 0451731 | 4/1991 | European Pat. Off. . |
| 2129901 | 12/1971 | Germany . |
| 2129968 | 12/1971 | Germany . |
| 4327098 | 2/1995 | Germany . |
| 2293799 | 4/1996 | United Kingdom . |

*Primary Examiner*—Harold J. Tudor
*Attorney, Agent, or Firm*—Sprung Kramer Schaefer & Briscoe

[57] ABSTRACT

A device for rapidly inflating an airbag. The airbag is accommodated in a steering wheel. The device has a housing, a compressed-gas container, a pyrotechnical propellant, a primer, a thruster, and a rupture disk. The propellant and the primer are accommodated in the housing. The housing also accommodates a gas-combining chamber with an outlet to the airbag and a part between the compressed-gas container and the gas-combining chamber and closed off by the rupture disk. The thruster destroys the rupture disk when the propellant ignites, allowing the combined gaseous products of the combustion of the propellant and the gas to escape into the airbag. The compressed-gas container is tubular and can be accommodated coaxial with or inside the steering-wheel column. The outlet to the airbag and the port in the housing comprise bores in the housing that essentially parallel the axis of the steering-wheel column. The space needed to accommodate the propellant, the primer, the thruster, and the rupture disk in the housing comprises a graduated-diameter cylindrical recess at a right angle to the axis of the steering-wheel column. The effective path traveled by the thruster and the rupture disk is coaxial with the recess.

14 Claims, 1 Drawing Sheet

DEVICE FOR INFLATING AN AIRBAG ACCOMMODATED IN A STEERING WHEEL

BACKGROUND OF THE INVENTION

The present invention concerns a device for inflating an airbag accommodated in a steering wheel, with a housing, a compressed-gas container, a pyrotechnical propellant, a primer, a thruster, and a rupture disk. The propellant and the primer are accommodated in the housing. The housing also accommodates a gas-combining chamber with an outlet to the airbag and a port between the compressed-gas container and the gas-combining chamber. The port is closed off by the rupture disk. The thruster destroys the rupture disk when the propellant ignites, allowing the combined gaseous products of the combustion of the propellant and the gas to escape into the airbag.

A device of this type is known from Europe Patent 0 554 919. The compressed-gas container and the pyrotechnical propellant are accommodated at the center of a bowl-shaped steering wheel at the upper end of the steering-wheel column. The gas container is preferably toroidal and concentric with the axis of the column and with the rim of the wheel. The propellant is accommodated at the center of the container.

The airbag disclosed in U.S. Pat. No. 5,482,315 fills with a combination of compressed gas and the gaseous combustion product of the propellant's ignition. The steering-wheel column itself constitutes the compressed-gas container, and the propellant is accommodate in the end of the column opposite the wheel.

The device disclosed in German OS 2 129 901 includes a housing that the outlet from a compressed-gas container opens into. The pressure inside the housing is the same as the pressure inside the gas container. A propellant is accommodated in the housing at a right angle to the incoming gas. When ignited, the propellant generates combustion products. These products force out in succession one partition between the propellant container and the inside of the housing and another partition that releases the combined gases into the airbag. Neither the airbag nor the gas container are accommodated in the steering wheel or steering-wheel column.

The devices have been produced and proven. There is, however, little room for accommodating them inside the steering wheel, and the airbag cannot be as large as it should be, especially because controls increasingly need to be accommodated in the available space as well to initiate concomitant actions on the part of the motor vehicle without the driver needing to take his hands off the wheel.

Making the compressed-gas container cylindrical and accommodating it below the steering wheel in the vicinity of the steering-wheel column has accordingly been proposed. The result is more room in the vicinity of the steering wheel facing the driver for accommodate a larger airbag and for extra controls within the driver's reach. Modifying the gas container and shifting it toward the steering-wheel column, however, necessitates a longer route for the gas to travel and makes it impossible to use the known sealing system, wherein just one disk-bursting component releases almost simultaneously the gaseous products of pyrotechnic combustion and the compressed gas into the airbag.

SUMMARY OF THE INVENTION

The object of the present invention is accordingly a more advanced version of the known device with more room to accommodate the necessary components with no need to take functional drawbacks into consideration. Furthermore, the components responsible for smooth operation are to be as simple and inexpensive as possible to manufacture, so that they can be operated with the advantage of the more spacious design and need not be sacrificed to the efforts at rationalization prevailing in the past.

This object is attained in accordance with the present invention in a device of the aforesaid type characterized in that the compressed-gas container is tubular and can be accommodated coaxial with or inside the steering-wheel column, the outlet to the airbag and the port in the housing comprise bores in the housing that essentially parallel the axis of the steering-wheel column, the space needed to accommodate the propellant, the primer, the thruster, and the rupture disk in the housing comprises a graduated-diameter cylindrical recess at a right angle to the axis of the steering-wheel column, and the effective path traveled by the thruster and the rupture disk is coaxial with the recess.

As in the prior art, the space that accommodates the propellant and the compressed-gas container inside the housing is closed by a rupture disk and opens immediately once the propellant ignites. Care is taken to ensure that the two gases impact each other at essentially a right angle as they flow and will accordingly combine thoroughly. Care is also taken to ensure that their paths will be as short as possible so that the blowout time will not be significantly different from that at the prior art due to the modification. Care is also taken in particular to ensure that the operationally significant component can be inexpensively manufactured to the tolerances prevailing on the industrial scale.

Advantageous embodiments and variations of the theory behind the present invention include the rupture disk being cup-shaped and having a face and a cylindrical section and breakoff sites in the form of thinner material extend around both the face and the cylindrical section, the outer diameter of the face being greater than the diameter of the cylindrical section, the rupture disk being secured to the housing directly in the vicinity of the face and by way of an annular spacer in the vicinity of the cylindrical section, the rupture disk and the housing being laser-welded together, the cylindrical recess in the housing being designed to allow all machining to be done from one side and the other side of the housing being continuous, a recess in the gas-combining chamber intercepting the rupture disk when the disk breaks out, the outlet to the airbag being displaced parallel to the port between the compressed-gas container and the gas-combining chamber by at least the distance traveled by the rupture disk, the thruster being in the shape of a hat and being attached at the edge to a threaded insert that accommodates the propellant and the primer, the thruster being a sealed port that opens when ignition starts and allows preliminary outflow of gaseous combustion products, the rupture disk having a hole that allows preliminary outflow of gaseous combustion products, a stop in the housing limiting the effective path traveled by the thruster, the compressed-gas container being welded to the housing and the housing being connected to an assembling flange by a threaded connection and a coupling ring.

BRIEF DESCRIPTION OF THE DRAWING

The FIGURE is a sectional view of the device according to the present invention.

DETAILED DESCRIPTION OF THE INVENTION

Figure 1:
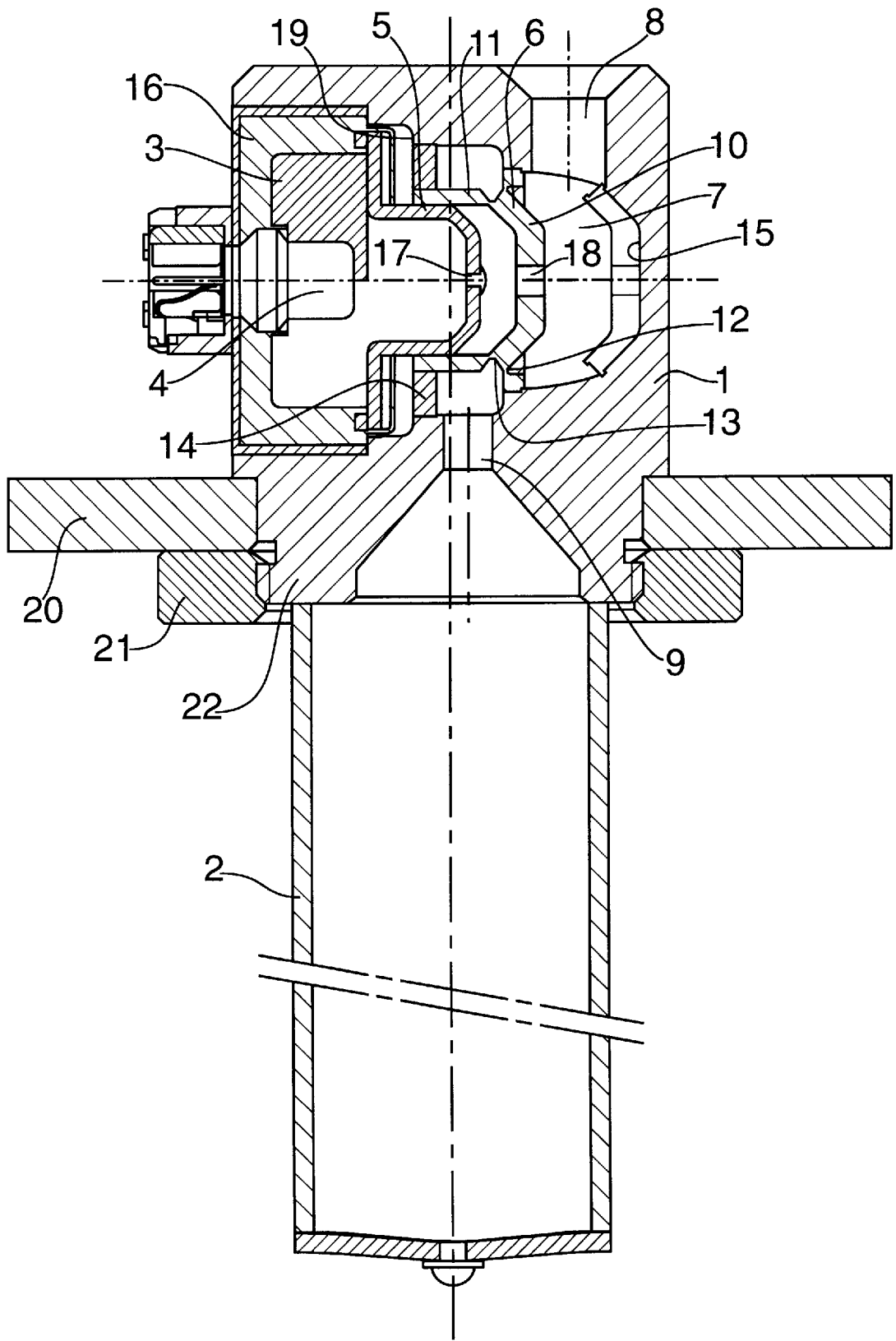

The central housing 1 illustrated in FIG. 1 has a threaded connection 22 and is connected to an assembling flange 20 by a coupling ring 21. Flange 20, not illustrated in its entirely, conventionally fastens the steering wheel to the steering-wheel column, A tubular compressed-gas container 2 is fastened to housing 1 by welding or a similar method. Gas can be injected into container 2 from the bottom. There is a port 9 for the gas in housing 1.

Housing 1 also has an outlet 8 for the combined gases that constitute the products of the combustion of the pyrotechnical propellant and the compressed gas and fill the airbag in the event of a crash. Combined-gases outlet 8 and gas port 9 are machined into housing 1 coaxial with tubular compressed-gas container 2 and open into a gas-combining chamber 7. Other, parallel, ports 9 and outlets 8 can easily be included as well. Thus, the open cross-section available to the gases can be adapted to any desired blowout times or choking ratios.

Propellant 3 and primer 4 are accommodated in a threaded insert 16 sealed by a thruster 5. Thruster 5 is attached to the edge of threaded insert 16 and can be operationally detached from it. Thruster 5 is provided with a sealed port 17. Port 17 is sealed just tight enough to prevent the usually powdered propellant 3 from escaping and seals the system off from the environment. Upon ignition, the pressure or ignition energy of primer 4 will open port 17 and allow the gaseous combustion product to more or less flow out before thruster 5, due to the increased pressure or ignition energy can accelerate out of a holder at the edge and against the cup-shaped rupture disk 6. Rupture disk 6 comprises a cylindrical section 11 and a face 10. Face 10 has a hole 18 that allows preliminary emergence of the combustion products. The cylindrical section 11 and the face 10 of rupture disk 6 are laser-welded to housing 1. There is an annular spacer 14 between housing 1 and cylindrical section 11, allowing the housing to easily be machined from the left without undercuts while secured in a chuck. Rupture disk 6 has two breakout sites 12 and 13 extending around it, allowing the center to break out when primer 4 activates. Thruster 5 will accordingly, due to the released ignition energy or the sudden combustion of propellant 3 and depending on the design, experience the impact necessary to open the system. The effective path traveled by thruster 5 is limited by annular spacer 14 or by a stop 19 in housing 1. The ripped-out area of face 10 will be intercepted in a recess 15 in the housing. Once face 10 breaks, gas port 9 will create a somewhat displaced but otherwise very low-loss path for the compressed gas flowing out to combined-gases outlet 8 by way of gas port 9. Along this path the gaseous products of the residual combustion of propellant 3 will be introduced through the port 17 in thruster 5, which will then come to rest with its outer edge against stop 19 or against annular spacer 14, at a right angle to the flow, and will be optimally combined. The expansion-dictated cooling of the compressed gas will be compensated for by the hot combustion gases. The calibration of port 17, the dimensioning of the open cross-sections of gas port 9 and combined-gases outlet 8, and the particular volume of propellant will affect the miscibility and temperature of the combined gases flowing into the airbag.

The device in accordance with the present invention can be cost-effectively manufactured. It allows free division and exploitation of the available space and represents a long-sought alternative to the known generic device.

I claim:

1. A device for rapidly inflating an airbag accommodated in a steering wheel, comprising: a housing, a compressed-gas container containing a compressed gas and connected to the housing, a pyrotechnical propellant in the housing, a primer in the housing, a gas-combining chamber in the housing having an outlet to an airbag and a port between the compressed-gas container and the gas-combining chamber and closed off by a rupture disk, a thruster for destroying the rupture disk when the propellant ignites to allow combined gaseous products of combustion of the propellant and the compressed gas to escape into the airbag, wherein the compressed-gas container is tubular and mountable coaxially with or inside a steering-wheel column, wherein the outlet to the airbag and the port in the housing comprise bores in the housing that are essentially parallel to a longitudinal axis of the compressed-gas container, wherein the housing has a space for accommodating the propellant, the primer, the thruster, and the rupture disk comprising a graduated-diameter cylindrical recess at a right angle to the longitudinal axis of the compressed-gas container, and wherein the effective path traveled by the thruster and the rupture disk is coaxial with the recess.

2. The device as in claim 1, wherein the rupture disk is cup-shaped, has a face and a cylindrical section and breakoff sites comprising thinner material extending around both the face and the cylindrical section.

3. The device as in claim 2, wherein the face has an outer diameter which is greater than a diameter of the cylindrical section.

4. The device as in claim 3, wherein the rupture disk is secured to the housing directly in the vicinity of the face and by an annular spacer in the vicinity of the cylindrical section.

5. The device as in claim 4, wherein the rupture disk and the housing are laser-welded together.

6. The device as in claim 1, wherein the cylindrical recess in the housing is configured to allow all machining to be done from one side of the housing and wherein another side of the housing is continuous.

7. The device as in claim 1, further comprising a recess in the gas-combining chamber that intercepts the rupture disk when the rupture disk breaks out.

8. The device as in claim 1, wherein the outlet to the airbag is displaced parallel to the port between the compressed-gas container and the gas-combining chamber by at least the distance traveled by the rupture disk.

9. The device as in claim 1, wherein the thruster is in the shape of a hat and is attached at an edge to a threaded insert that accommodates the propellant and the primer.

10. The device as in claim 1, wherein the thruster has a sealed port that opens when ignition starts and allows preliminary outflow of gaseous combustion products.

11. The device as in claim 10, wherein the rupture disk has a hole that allows preliminary outflow of gaseous combustion products.

12. The device as in claim 1, further comprising a stop in the housing that limits the effective path traveled by the thruster.

13. The device as in claim 1, wherein the compressed-gas container is welded to the housing.

14. The device as in claim 1, wherein the housing is connected to an assembling flange by a threaded connection and a coupling ring.

* * * * *